United States Patent Office 3,475,159
Patented Oct. 28, 1969

3,475,159
METHOD FOR PREPARING TUNGSTEN POWDERS DOPED WITH REFRACTORY METAL OXIDES
Robert D. Hansen, Midland, Mich., assignor to The Dow Chemical Company, Midland, Mich., a corporation of Delaware
No Drawing. Filed Jan. 16, 1967, Ser. No. 609,355
Int. Cl. B22f 9/00; C22c 1/04; C01g 41/00
U.S. Cl. 75—.5                                9 Claims

ABSTRACT OF THE DISCLOSURE

Tungsten powders containing a controlled dispersion of a refractory metal oxide are prepared by (1) precipitating a novel, partially neutralized, particulate tungstic acid sol of the formula:

$$H_{2-a}(NH_4)_aWO_4 \cdot xH_2O$$

where $a$ is 0.1–0.3 and $x$ is 0–2, prepared as ultrafine particles in dendritic cluster form having a particle diameter of about 0.1–2 microns and containing sorbed refractory metal salts which decompose thermally to give refractory metal oxides, (2) separating the tungstic acid sol from the precipitation medium, (3) heating the sol to dryness at an elevated temperature in the presence of air to form the refractory metal oxide and a tungstic oxide, and (4) reducing the impregnated tungstic oxide to give a tungsten powder containing the refractory metal oxide. By control of the precipitation and impregnation process, sorption of the refractory metal salt can be obtained as either a surface coating of the particulate dendritic clusters or as an essentially uniformly distributed dispersion throughout each particle.

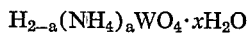

This invention concerns a novel method for making a tungsten powder containing one or more dispersed refractory metal oxides.

The utility of dispersed phases in refractory metallurgy is well known. Dispersed phases serve to increase the strength and recrystallization temperature of the metal in which they are dispersed, thereby increasing the useable temperature of the metal. The presence of a dispersed phase also retards grain growth during consolidation of the metal, whether by sintering or hot pressing. The requirements of the dispersed phase are that it be stable both physically (i.e., with respect to melting) and chemically (i.e., with respect to reacting with the matrix) at the highest temperature to which the metal is subjected, and that it be insoluble in the metal. The efficiency of the dispersed phase is dependent on the state of subdivision of the dispersed phase and on the inter-particle distance, with the greatest effect being exerted when the particles are smallest and the inter-particle distance is smallest.

Conventionally, such dispersions are prepared by several methods:

(1) Powdered refractory oxides are mixed with the metal powders, sometimes by ball-milling to get better distribution.

(2) Metal powders are mixed with aqueous solutions of metal salts, e.g., Th(NO₃)₄, to achieve adsorption of metal salts on the surface of the metal. This is followed by ignition to convert the salts to their refractory oxides.

(3) Fluidizing of the metal powder in a gas stream, and coating the powder by carrying out a chemical reaction on the surface of the fluidized powder.

(4) Precipitation of the insoluble species such as tungstic or molybdic acid around a submicron particle of a refractory oxide such as ThO₂ followed by conversion of the precipitated species into an oxide and reduction to give a metal powder containing dispersed particles of refractory oxides.

It has now been discovered in accordance with this invention that better dispersions of refractory metal oxides in tungsten metal powders can be prepared by (1) incorporating one or more refractory metal salts on or in a sol of tungstic acid having the formula $$H_{2-a}(NH_4)_aWO_4 \cdot xH_2O$$

wherein "$a$" varies between 0.1 and 0.3 and "$x$" varies between 0 and 2 and wherein particles of said sol range predominantly between 0.1 and 2 microns in particle diameter and are dendritic clusters as to structure; (2) heating the mixture of tungstic acid and refractory metal salt in the presence of air or oxygen to an elevated temperature sufficient to convert the tungstic acid and the metal salt to their respective oxides; and (3) heating the resulting mixed oxides at an elevated temperature in the presence of hydrogen to reduce the tungstic oxide to the corresponding tungsten metal powder containing one or more dispersed refractory metal oxides. Such doped tungsten powders are useful in powder metallurgy. Their particle diameters range predominantly between 0.4 and 2 microns.

In the present invention one or more dispersed refractory metal oxides are incorporated in a tungsten metal powder by either of the following methods: (1) A tungstic acid sol as previously characterized is prepared and to the freshly prepared sol is added a solution of the desired refractory polyvalent metal salt with stirring. The polyvalent metal cations are attracted to the surface of the negatively charged sol, covering the surface of the sol with the metal salt. An added advantage of this method is that addition of the metal salt flocculates the sol, enabling a much simpler removal of water by filtration. (2) Alternatively, during the formation of the characterized tungstic acid sol, a solution of the desired metal salt is added gradually at a substantially uniform rate over the period of time required for formation of the sol. This results in inclusion of the metal salt within the growing tungstic acid sol particles.

The advantages of the present invention are in the resultant fine degree of dispersion of the dispersed phase. Thus, in alternative method (1), each tungstic acid particle is covered with the dispersed phase, while in alternative method (2), each particle has an even finer dispersion of the dispersed phase throughout each tungstic acid particle.

The refractory metal oxides are derived from those alkaline earth and heavy metal salts which decompose on heating at an elevated temperature, e.g., between 100° and 600° C., to form their corresponding oxides, which oxides are not readily reducible. Such, for example, are calcium bromide, calcium nitrate, magnesium chloride, cerous nitrate, yttrium nitrate, thorium chloride, thorium nitrate, titanium nitrate, aluminum nitrate, chromic chloride, hafnium oxychloride, zirconium oxychloride and beryllium chloride.

The tungstic acids used in the process of this invention have the formula $H_{2-a}(NH_4)_aWO_4 \cdot xH_2O$, wherein "$a$" has a value between 0.1 and 0.3 and "$x$" has a value between 0 and 2. Such tungstic acids may be prepared in several ways. An aqueous solution of an alkali metal tungstate, e.g., Na₂WO₄·2H₂O, advantageously containing from about 2–12 weight percent sodium tungstate, can be passed at ca. 0°–150° C. and advantageously at room temperature through a bed of a conventional acid-form phosphonic acid or sulfonic acid cation exchange resin, e.g., Dowex 50W X-4 H⁺ resin, a polymeric styrene sulfonic acid crosslinked with 4% divinylbenzene, in an amount at least sufficient to exchange sodium ions for protons.

The effluent tungstic acid solution thereby resulting is reacted with sufficient aqueous ammonium hydroxide as such or added as equivalent ammonia gas to give a solution which, when heated up to 50°–150° C. forms a sol having dendritic clusters with needle-like projections from the core, having the formula $$H_{1.7-1.9}(NH_4)_{0.1-0.3}WO_4 \cdot xH_2O$$

In a variation of the preceding method, an aqueous solution of sodium or other alkali metal tungstate is passed through a bed of a strong acid cation exchange resin in the ammonium salt form in amount at least sufficient to exchange the sodium or other alkali metal cations for $NH_4^+$ ions. Additional $NH_4^+$ salt, e.g., $NH_4Cl$ or $NH_4NO_3$, may be added to reduce particle size of the resulting dendritic clusters. The operable range of $NH_4^+$ salt useful in reducing particle size is from 0 to $10^{-1}$ molar. The resulting solution is treated batchwise with acid-form strong acid cation exchange resin in amount sufficient to give a solution which on heating to 50°–150° C. forms a sol of dendritic clusters of the formula $H_{2-a}(NH_4)_aWO_4 \cdot xH_2O$. A proportion of 1.9 equivalents of resin and advantageously up to ca 2.5 equivalents of acid-form resin as $H^+$ per mole of $WO_3$ is used. There is no advantage in using higher proportions of acid-form resin.

In another alternative, ammonium paratungstate, $(NH_4)_6W_7O_{24} \cdot 6H_2O$, is slurried in water at 0°–150° C. with acid-form phosphonic or sulfonic acid cation exchange resin in amount at least sufficient to give one equivalent of resin and advantageously up to 1.7 equivalents of resin as $H^+$ per mole of $WO_3$. The resin is filtered off. When the resulting tungstic acid solution is heated up to about 50°–150° C., a sol whose particles are dendritic clusters of composition $H_{2-a}(NH_4)_aWO_4 \cdot xH_2O$ begins to form.

Shortly after the first signs of sol formation are noted, an aqueous solution of one or more refractory metal salts, e.g., 1 N $Th(NO_3)_4$ is pumped into the vessel at a uniform rate to coincide with the sol formation (usually 60–90 minutes), to give ca. 0.05 to 4% $ThO_2$ based on tungsten. The solution is meanwhile kept heated at 50°–150° C. After addition of $Th(NO_3)_4$ is complete, the solution is held at temperature to insure complete formation of the tungstic acid sol, advantageously for several hours. The tungstic acid sol and residual solution are then allowed to cool to 20°–30° C. and filtered to recover precipitated tungstic acid containing $Th(NO_3)_4$. The precipitate is dried at 110° C., ignited at 600° C. in air to convert the $Th(NO_3)_4$ to $ThO_2$ and the tungstic acid to $WO_3$. The resulting coalesced mixed oxide material after light grinding is a fine yellow powder having an average particle diameter of about 0.2 micron. The existence of the dispersed phase ($ThO_2$) cannot be detected by light or electron microscopy. It is reduced in a hydrogen atmosphere at a maximum temperature of 800° C. to give a product tungsten powder containing $ThO_2$ dispersed therein, which product is a dark gray fine powder having a particle diameter ranging between 0.4 and 2 microns as determined by electron microscopy.

Alternatively, the tungstic acid sol formation is allowed to go to completion by heating to about 50°–150° C. for about 3 hours and $Th(NO_3)_4$ is then added with mixing. This procedure gives tungstic acid particles coated with $Th(NO_3)_4$ which product is then dried and ignited as in the preceding paragraph to give mixed oxide material which, after light grinding, is a fine yellow powder having an average particle diameter of ca. 0.2 micron. The existence of the dispersed phase ($ThO_2$) cannot be detected by electron microscopy. It is reduced as described in the preceding paragraph to give a tungsten powder containing dispersed $ThO_2$. The product is dark gray. Its particle diameter ranges between 0.4 and 2 microns.

In addition to Y and Th salts, alkaline earth and heavy metal salts which also can be heated in air at an elevated temperature to give refractory oxides can be used, e.g., calcium bromide, calcium nitrate, magnesium chloride, cerous nitrate, titanium nitrate, aluminum nitrate, chromic chloride, hafnium oxychloride, zirconium oxychloride and beryllium chloride.

Operable temperatures for incorporating refractory metal salts in the tungstic acid sols range between 50° and 150° C. when the refractory metal salt is added before sol formation is substantially complete. If such salt is added after sol formation is substantially complete, any temperature between 0° and 150° C. is operable.

If refractory metal salt is added while sol formation is taking place, beginning with the first appearance of cloudiness, an addition time of about 1 to 1½ hours with continued heating and mixing is preferable. If the refractory metal salt is added after sol formation is complete, an addition and mixing time of several minutes suffices. Generally, an amount of refractory metal salt to give 0.05 to 10 weight percent oxide, tungsten basis, is used.

Pressure is not an important variable. Ambient pressure is advantageously used.

The following examples describe completely representative specific embodiments and the best modes contemplated by the inventor for carrying out the invention. They are not to be considered as limitative of the invention other than as defined in the claims.

Example 1

An aqueous solution containing 4 lbs. of $$Na_2WO_4 \cdot 2H_2O$$

as a 6 percent solution was passed through a column containing 20 gram equivalents of a cation exchange resin, Dowex 50W X–4, 50–100 mesh, in the $NH_4^+$-form. The resulting ammonium tungstate effluent was collected and contacted batchwise with 18 lbs. of acid-form Dowex 50W X–4, 50–100 mesh, sulfonic acid cation exchange resin. After stirring for 15 minutes, the resin was removed by filtration, and the filtrate tungstic acid solution containing exchanged $NH_4^+$ was placed in a flask fitted with a stirrer and a condenser. Heat was applied and when the temperature was about 85° C., formation of tungstic acid sol began. About 20 minutes after the first signs of cloudiness were observed, a solution of 1 N $Th(NO_3)_4$ solution was pumped into the vessel at a uniform rate. This was added at a rate of 50 cc./hr. for a total time of 1.5 hours, the mixture meanwhile being heated to 95° C. After the $Th(NO_3)_4$ addition was complete, the solution was held at temperature for several hours to insure complete formation of $$H_{2-a}(NH_4)_aWO_4 \cdot xH_2O$$

containing included $Th(NO_3)_4$. When the solution had cooled, it was filtered to recover precipitated tungstic acid containing included $Th(NO_3)_4$, the precipitate was dried at 110° C., ignited at 600° C. in air to convert the $Th(NO_3)_4$ to $ThO_2$ and the $H_{2-a}(NH_4)_aWO_4 \cdot xH_2O$ to $WO_3$. The resulting mixed oxide material was then reduced in a hydrogen atmosphere at a maximum temperature of 800° C. to produce product tungsten powder containing $ThO_2$ dispersed therein. The product was a fine powder, dark gray in color and had a particle diameter ranging between 0.4 and 2 microns.

An alternate method is to allow the formation of tungstic acid sol to go to completion by heating the tungstic acid filtrate at 95° C. for about 3 hours, and then to add the $Th(NO_3)_4$ at that time, with agitation. This alternative gives the tungstic acid sol particles coated with $Th(NO_3)_4$, which are then filtered, dried, ignited and reduced in a hydrogen atmosphere, as indicated previously, to give tungsten powder coated with $ThO_2$. It, too, is dark gray in color. The particle diameter ranges between 0.4 and 2 microns.

The procedures described in the examples are repeated with the substitution of an aqueous solution of one or more of any of the other refractory metal salts which, on heating at an elevated temperature in the presence of air, give refractory metal oxides, to give equally useful products.

I claim:

1. A method for preparing a tungsten powder containing a refractory metal oxide which comprises: (1) preparing a partially neutralized, particulate tungstic acid sol having the formula $H_{2-a}(NH_4)_aWO_4 \cdot xH_2O$, wherein "$a$" varies between 0.1 and 0.3 and "$x$" varies between 0 and 2, as ultrafine particles in dendritic cluster form with a particle diameter which ranges predominantly between 0.1 and 2 microns, and (a) while the tungstic acid sol is being formed, or (b) after the tungstic acid sol is formed, admixing therewith an aqueous solution of a salt of a refractory metal which thermally decomposes in the presence of air to give a refractory metal oxide, (2) separating the resulting tungstic acid containing admixed refractory metal salt, (3) heating said admixture to an elevated temperature in the presence of air sufficient to convert the refractory metal salt to an oxide and the partially neutralized tungstic acid to $WO_3$, and (4) reducing the $WO_3$ in the resulting admixture by heating at an elevated temperature in the presence of hydrogen whereby a finely divided tungsten powder containing refractory metal oxide is obtained.

2. The method of claim 1 wherein the tungstic acid sol is prepared by passing aqueous sodium tungstate through a bed of an acid-form strongly acidic cation exchange resin in amount at least sufficient to exchange sodium ions for protons, partially neutralizing the effluent tungstic acid with ammonium hydroxide in amount sufficient to give a solution which when heated to 50° to 150° C. forms said partially neutralized, particulate tungstic acid sol, and heating the resulting solution at 50°–150° C. to form said partially neutralized, particulate tungstic sol.

3. Method of claim 1 wherein the tungstic acid sol is prepared by reacting batchwise a dispersion in water of ammonium paratungstate with an acid-form sulfonic acid cation exchange resin using between 1 and 1.7 equivalents of $H^+$ resin per mole of $WO_3$ as ammonium paratungstate, and the resulting tungstic acid solution containing ammonium ions is separated from the cation exchange resin and heated at 50° to 150° C. for a time sufficient to form the said tungstic acid sol.

4. Method of claim 1 wherein the tungstic acid sol is prepared by passing aqueous alkali metal tungstate through a bed of a strong acid cation exchange resin in the ammonium salt form in amount at least sufficient to exchange alkali metal cations for ammonium ions and reacting the resulting effluent batchwise with strong acid cation exchange resin in the acid form in amount sufficient to give a solution which on heating to 50° to 150° C. forms the said tungstic acid sol.

5. A particulate tungstic acid containing one or more sorbed refractory metal salts which decompose on heating at an elevated temperature to give a refractory metal oxide, said tungstic acid component having the formula $H_{2-a}(NH_4)_aWO_4 \cdot xH_2O$, wherein "$a$" ranges between 0.1 and 0.3 and "$x$" ranges between 0 and 2, the particles of said tungstic acid being dendritic clusters ranging between 0.1 and 2 microns in particle diameter and said refractory metal salt being present in amount sufficient to give 0.05 to 10 weight percent refractory metal oxide, tungsten basis.

6. A product as claimed in claim 5 wherein the refractory metal salt is sorbed on the surfaces of the tungstic acid particles.

7. A product as claimed in claim 5 wherein the refractory metal salt is sorbed throughout the tungstic acid particles.

8. A product as claimed in claim 5 wherein the refractory metal salt is thorium nitrate.

9. The method of claims 1, 2, 5 or 6 wherein the refractory metal salt is thorium nitrate.

References Cited

UNITED STATES PATENTS

| | | | |
|---|---|---|---|
| 1,089,757 | 3/1914 | Frech | 75—207 |
| 1,662,027 | 3/1928 | De Graaff | 75—206 |
| 2,244,325 | 6/1941 | Bird | 252—301.1 |
| 2,489,912 | 11/1949 | Lilliendahl | 75—207 |
| 3,054,654 | 9/1962 | Lilliendahl et al. | 75—207 X |
| 3,231,329 | 1/1966 | Weiss et al. | 23—140 |
| 3,271,142 | 9/1966 | Hammond et al. | 252—301.1 |
| 3,278,281 | 10/1966 | Ehringer | 75—206 |
| 3,284,230 | 11/1966 | Heytmeijer et al. | 75—206 |
| 3,351,438 | 11/1967 | Millner et al. | 75—207 |

OTHER REFERENCES

Annali Di Chimica (Rome), vol. 43, No. 7, November 1953, pages 443–447.

Mellor, "A Comprehensive Treatise on Inorganic and Theoretical Chemistry," vol XI, 1948, pages 762–771.

CARL D. QUARFORTH, Primary Examiner

A. J. STEINER, Assistant Examiner

U.S. Cl. X.R.

75—206, 207; 252—301.1